G. B. KOHLER.
FARE BOX.
APPLICATION FILED OCT. 12, 1908.
988,881.
Patented Apr. 4, 1911.
4 SHEETS—SHEET 1.
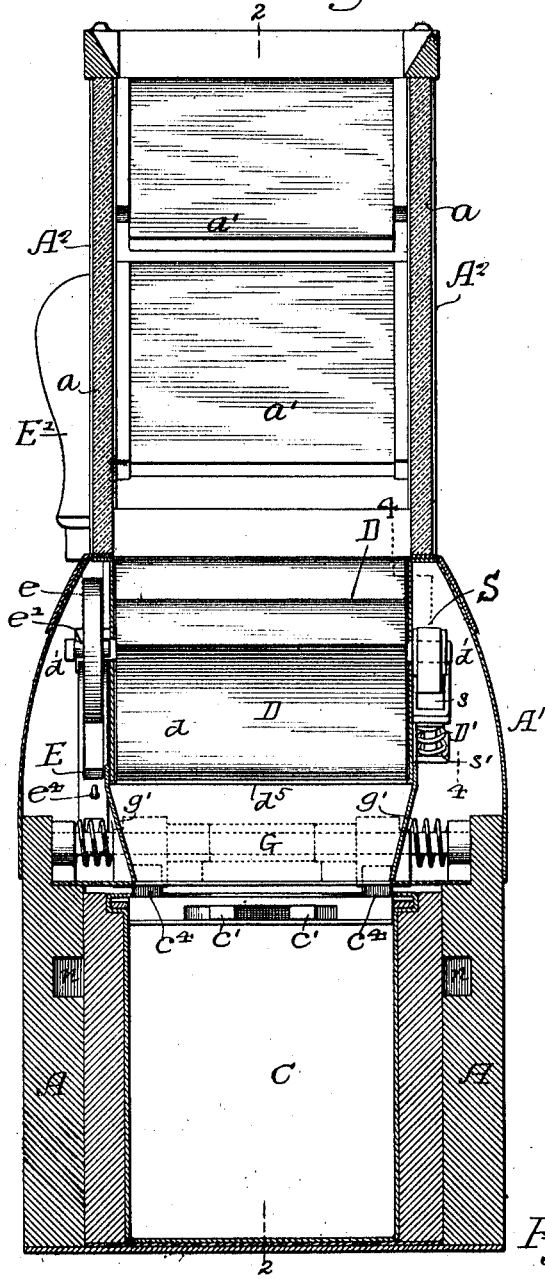
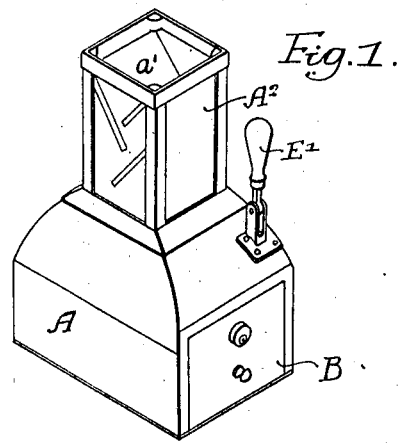
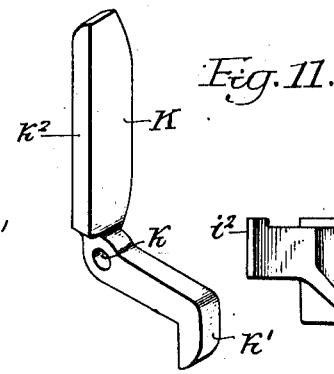
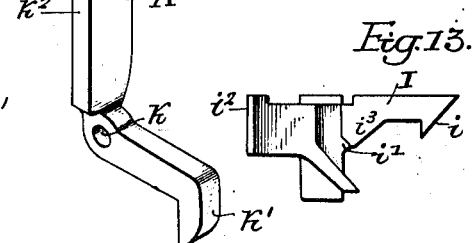
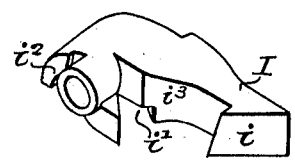
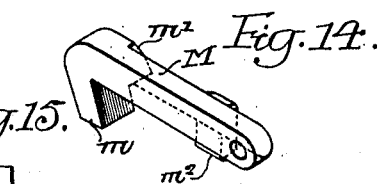
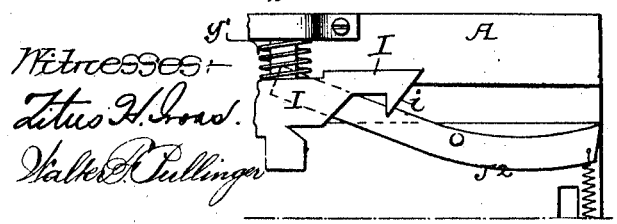
Witnesses:
Titus H. Frank
Walter P. Pullinger
Inventor
George B. Kohler
by his Attorneys
Howson & Howson

G. B. KOHLER.
FARE BOX.
APPLICATION FILED OCT. 12, 1908.

988,881.

Patented Apr. 4, 1911.
4 SHEETS—SHEET 2.

Inventor
George B. Kohler.
by his Attorneys,
Howson & Howson

G. B. KOHLER.
FARE BOX.
APPLICATION FILED OCT. 12, 1908.

988,881.

Patented Apr. 4, 1911.
4 SHEETS—SHEET 3.

Inventor
George B. Kohler
by his Attorneys.
Howson & Howson

Witnesses:

UNITED STATES PATENT OFFICE.

GEORGE B. KOHLER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

FARE-BOX.

988,881. Specification of Letters Patent. Patented Apr. 4, 1911.

Application filed October 12, 1908. Serial No. 457,572.

*To all whom it may concern:*

Be it known that I, GEORGE B. KOHLER, a citizen of the United States, residing in Philadelphia, Pennsylvania, have invented certain Improvements in Fare-Boxes, of which the following is a specification.

The object of my invention is to construct a compact, easily operated and accurate fare box which cannot be tampered with and which can be readily applied to the rail or frame of a passenger car particularly of the type in which the passenger pays the fare on entering the car.

Figure 2:
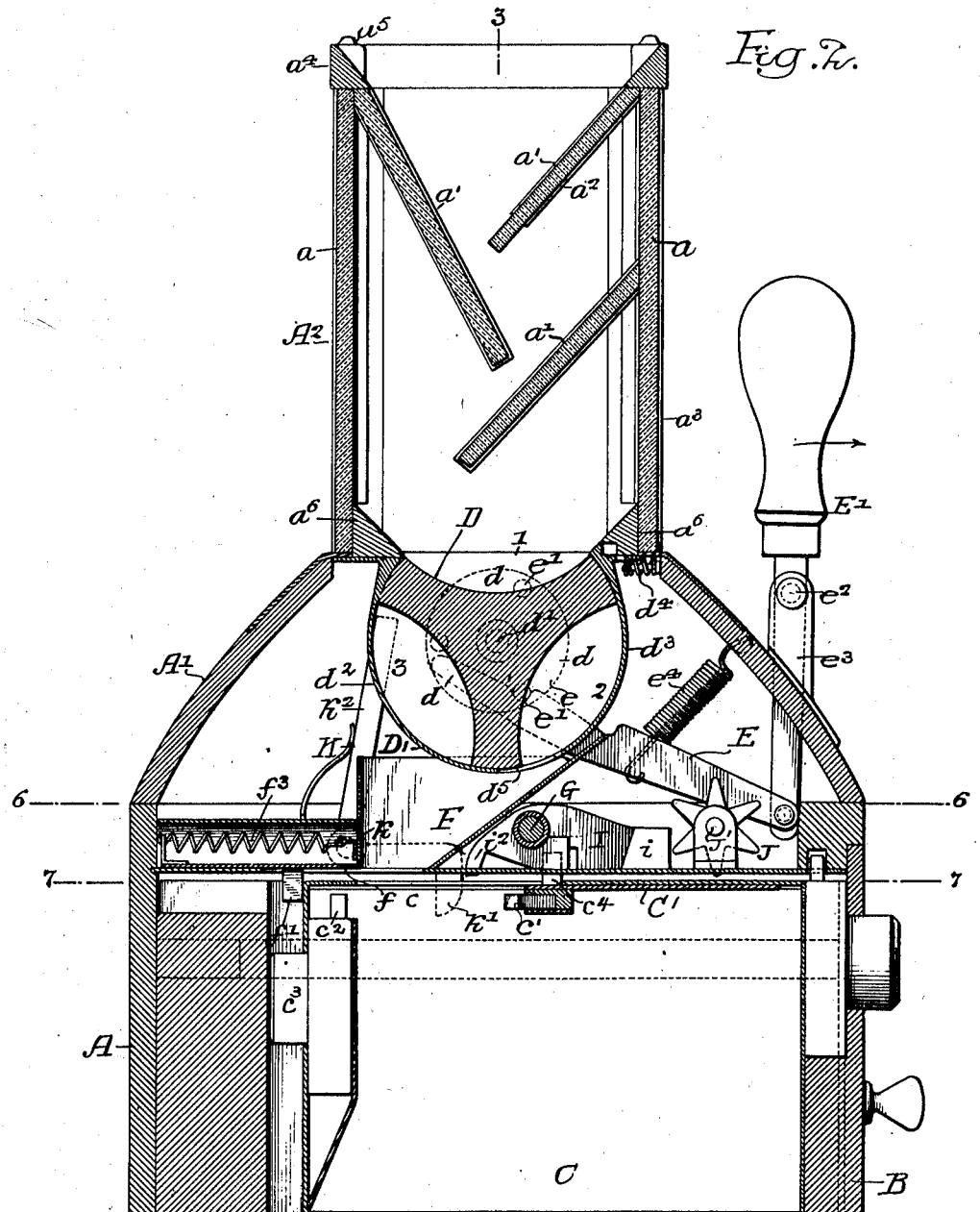
Figure 2A:
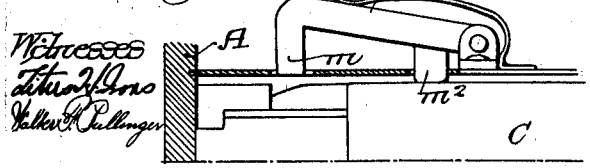
Figure 4:
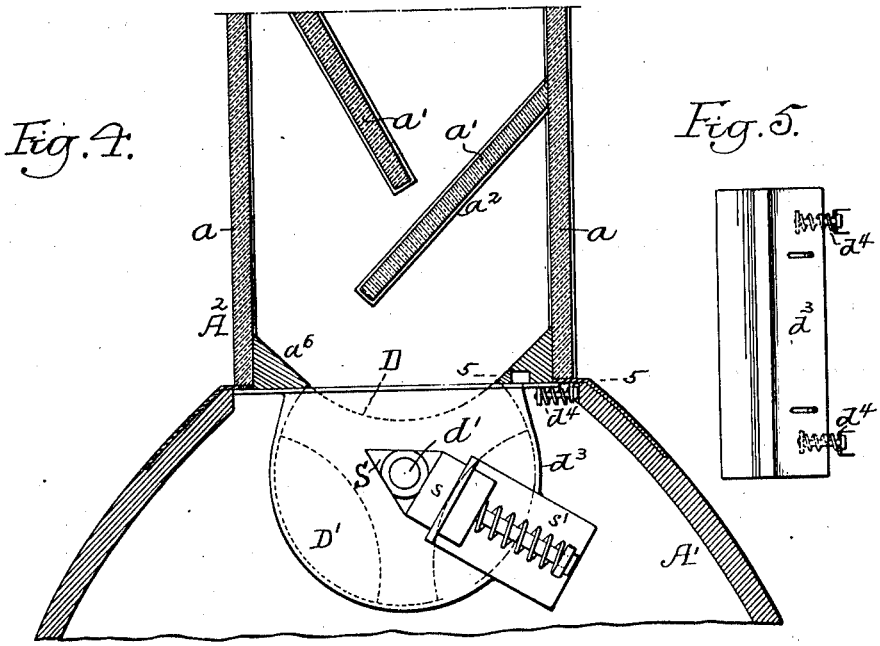
Figure 5:
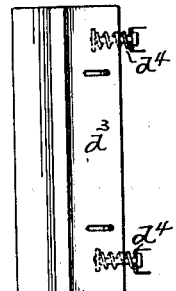
Figure 10:
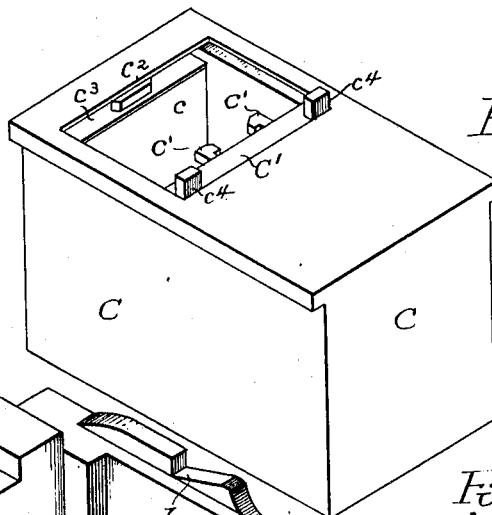
Figure 9:
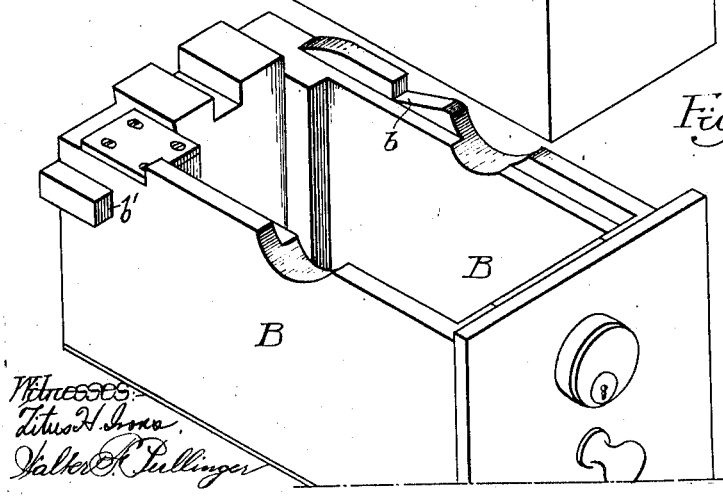
Figure 7:
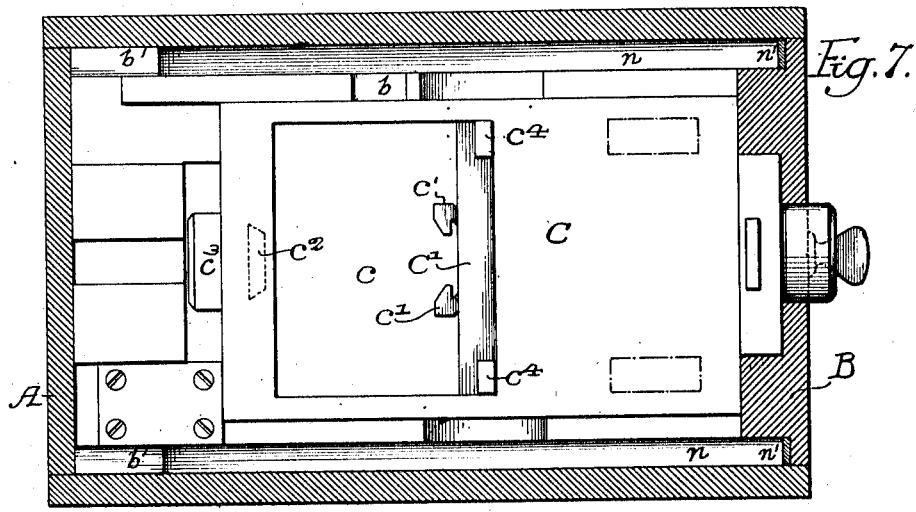
Figure 6:
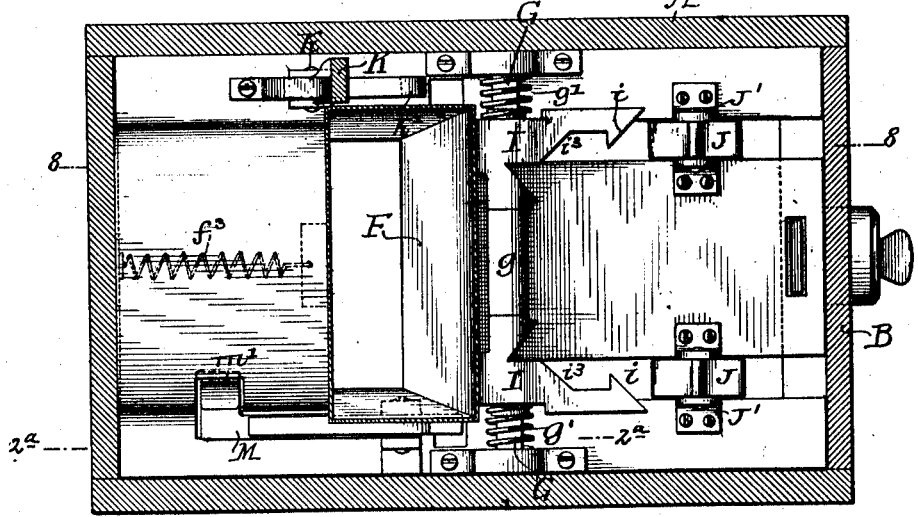
Figure 8:
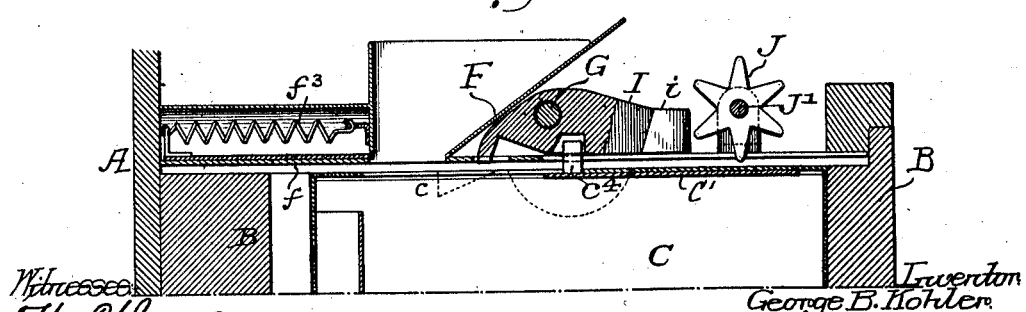

In the accompanying drawings—Figure 1 is a perspective view of my improved fare box; Fig. 2 is a sectional elevation on the line 2—2, Fig. 3; Fig. $2^a$ is a sectional view on the line $2^a$—$2^a$, Fig. 6. Fig. 3 is a sectional elevation on the line 3—3, Fig. 2; Fig. 4 is a sectional view on the line 4—4, Fig. 3; Fig. 5 is a sectional plan view on the line 5—5, Fig. 4; Fig. 6 is a sectional plan view on the line 6—6, Fig. 2; Fig. 7 is a sectional view on the line 7—7, Fig. 2; Fig. 8 is a sectional view on the line 8—8, Fig. 6; Fig. 9 is a detached perspective view of the drawer; Fig. 10 is a detached view of the fare receptacle; Figs. 11, 12 and 13 are detached views illustrating details of the locking mechanism; Fig. 14 is a detached view of one of the levers; and Fig. 15 is a view of a modification of the means for preventing tampering with the locking pawl.

A is the body of the fare box containing the drawer B, in which is mounted the detachable fare receptacle C. On the body portion of the box is a cap section A′ carrying the fare receiving section $A^2$; this fare receiving section has glazed inclined deflectors $a'$, which are arranged so that one will overlap the other. When the fare is placed in the box it slides down one deflector onto another and onto the rotating discharge device D at the bottom of the fare receiving section. The arrangement of the deflectors is such that it is impossible to remove the fare from the box after it is once past the deflectors. In the present instance the deflectors are supported by metallic channeled sections $a^2$ attached to the vertical corner pieces $a^3$ of the frame and mounted on the corner pieces is an open top frame $a^4$; its inner surface being beveled as indicated in Fig. 2. The frames are held to the section A′ by vertical bolts $a^5$.

It will be noticed that the channeled members $a^2$ which carry the upper glazed deflector stop short of the inner end of the deflector, so that the edge of the deflector at the inner end is some distance away from the side. This prevents a coin inserted in the box on edge being held by the deflector, as the coin will pass through the space between the deflector and the side of the casing.

D is a rotating discharge device, triangular in cross section, having three concaved floors $d$ to receive the coin. These floors aline with the beveled portions $a^6$ in the bottom of the fare receiving section, so that the coin or ticket must either drop upon the floor $d$ or slide upon it from one of the beveled sections $a^6$.

The discharge device is mounted on trunnions $d'$ carried by a metallic frame D′ secured to the section A′ in any suitable manner. The frame has a fixed curved portion $d^2$ which partially incloses the space occupied by the discharge device. On the opposite side is a curved plate $d^3$ which is held against the carrier by springs $d^4$, this plate is slotted and adapted to guiding pins as illustrated in Fig. 5, so that the tendency of the spring is to keep the plate always against the carrier. The object of this construction is to allow the plate $d^3$ to yield should a coin or ticket accidentally slip between the discharge device and the casing.

On one trunnion $d'$ is a disk $e$ having three sets of pins $e'$ which are engaged by a sliding pawl arm E pivoted to one arm of an operating lever E′ pivoted at $e^2$ to a bracket $e^3$ mounted on the section A′ of the casing. The section is slotted for the passage of the operating lever and the arm E is held against the pins $e'$ of the disk $e$ by a spring $e^4$, one end of the spring being attached to the arm E while the other end of the spring is attached to the casing A′, so that as the operating arm is moved in the direction of the arrow it moves the arm E longitudinally and as the arm is notched to receive the pins $e'$ it will turn the carrier D a third of a revolution, shifting one of the floors $d$ from the position indicated by the numeral 1 to the position indicated by the numeral 2, and when in this position the coin will drop through the opening $d^5$ in the casing D' into a hopper F directly above the fare receiving box and another floor will be presented for the reception of other fares.

The carrier is so shaped that fares cannot possibly become jammed between the casing and the carrier. The carrier is locked in the position to which it is adjusted by a plunger $s$ adapted to guides on the casing D' and a spring $s'$ back of the plunger tends to force it against the triangular block S mounted on a trunnion $d'$ of the carrier. As the carrier is shifted the block will yield and spring forward to lock the carrier in the position to which it is adjusted, so that no matter if the box is shaken to tamper with it, it is impossible to shift the carrier without actuating it through the medium of the operating lever E'.

The mechanism of the fare receiving section is set forth and claimed in a division of this application for patent filed by me on the 14th day of October 1909, under Serial No. 522,891 and therefore I lay no claim to it in this case.

I will now describe the portion of the box in which the receptacle is retained as it will be understood that the receptacle must be such that it can be readily removed from the box and carried to the proper office to be opened and then another or the same receptacle placed in position to receive the fares of another trip or a day, according to the regulations of the road.

Mounted in the body portion A is a sliding drawer B in which is mounted the removable fare receptacle C; this fare receptacle consists in the present instance of a quadrangular sheet metal casing C, as indicated in Fig. 10, having a sliding cover C' adapted to close the opening $c$ in the top of the receptacle. This cover is adapted to ways and has two hooked keepers $c'$ which engage a bolt $c^2$ of the lock $c^3$ fastened permanently in one end of the receptacle. The edges of the bolt $c^2$ are beveled and the keepers are spring actuated so that when the sliding cover C' is closed the keepers will be spread apart as they come in contact with the bolt and spring back of the bolt, retaining the cover in position.

Projecting upward from the cover in the present instance are two lugs $c^4$ which engage mechanism which holds the cover as the drawer with the receptacle is drawn out, thus causing the cover to close the opening $c$ in the receptacle and by continuing the movement the keepers $c'$ spring past the bolt of the lock so that by the time the drawer is opened to its full extent for the removal of the receptacle the cover has completely closed the opening and is locked and cannot be opened until it is taken to the office where the fares are counted. To open the box all that is necessary is to place a key in the lock and withdraw the bolt from the keepers and the lid can be moved back and the contents of the box discharged.

On the transverse rod G are two pawls I, one above each side of the fare box, and spacing these pawls is a sleeve $g$ acting as a stop to prevent them coming closer together than illustrated in Fig. 6. Back of each pawl is a spring $g'$ which tends to force the pawls toward each other. Each pawl has a hook $i$ in the path of a lug $c^4$, so that when the drawer is pushed in these lugs strike the pawls and spread them apart and as soon as the lugs pass the hooked portions the pawls spring back of the lugs and prevent the withdrawal of the box without the slide being first closed and locked.

As the drawer is pushed farther into the box the lugs ride on the inclined portions $i^3$ and force the pawls apart again and enter the diagonal slots $i'$ in the pawls and are held in these slots. Thus the slide is retained in its open position as illustrated in Fig. 2 until the drawer is again opened. When the drawer is pulled out the first action of the lugs is to lift the pawls, so that the lugs will ride under them. On the pawls are arms $i^2$ which prevent the lifting of the pawls unless the lugs $c^4$ on the fare receptacle are in the proper position. Then the arms are free to pass back of the receptacle.

In order to prevent tampering with the pawls I provide star wheels J mounted on spindles J' which enter the grooves for the passage of the lugs $c^4$, so that in case an instrument is placed to lift the pawls in order that the fare box may be extracted one or other of the arms of the star wheel will jam against the instrument and prevent it being inserted in the slots. Lever mechanism, as shown at $j^2$, Fig. 15, may be used instead of the star wheel form of stop if desired.

In order to close the opening in the hopper F when the fare receptacle C is not in position, I provide a slide $f$ having a lug $f'$ which is in the path of the fare receptacle, so that when the fare receptacle, which is carried by the drawer, is forced into position it will act upon the lug and push the slide back, as illustrated in Fig. 2. A spring $f^3$ tends to move the slide forward the moment the drawer is opened.

K is a lever pivoted at $k$ and having a hooked arm $k'$, which engages a notch $b$ in the drawer B, the other arm $k^2$ of the lever being in the path of the pawl arm E connected to the operating lever E', so that the operating lever must be moved to project the arm E to strike against the lever K and move it out of engagement with the drawer before the drawer can be opened. By this arrangement all fares must be discharged from the receiving section into the receptacle before the drawer can be opened and the fare receptacle removed.

In order to prevent the insertion of the drawer into the fare box without the fare receptacle, I provide a lever M pivoted to the casing and having a projection $m$ which is in the path of the drawer, and this projection has a lug $m'$ at the side which engages a notch in the slide $f$ which closes the hopper F, so that the slide is locked in its closed position until the drawer with the receptacle in place is moved into position. On the lever M is a lug $m^2$ which is in the path of the fare receptacle, so that when the fare receptacle is in the drawer and the drawer pushed into place, the fare receptacle will strike this lug and lift the lever so as to allow the drawer to pass the hooked projection $m'$ of the lever. The lever will also be lifted clear of the slide $f$ so that the drawer will push the slide back as it is forced into position. When the drawer is opened the lever falls down into position and locks the slide in its closed position. Thus it will be seen that it is impossible by this construction to either open the hopper so as to allow the fares to drop into the drawer compartment, or even into the drawer, and it is impossible to push the drawer into position unless the fare receptacle is mounted in the drawer. This insures the fare receptacle always being put in position before the fare box can be operated. The drawer 3 is prevented from being entirely removed from the fare box by projections $b'$ on each side of the drawer which travel in ways $n$ in the box; at the front of the box are stop plates $n'$ with which the projections come in contact.

I claim:—

1. The combination in a fare box, of a fare receiving section, a discharge device, a fare receptacle, a drawer in which the fare receptacle is mounted, said receptacle having a sliding cover, a hopper mounted above the drawer, a spring slide therein, and a lug on the slide adapted to be engaged by the fare receptacle when it is forced into position to open the bottom of the hopper.

2. The combination in a fare box, of a drawer, a fare receptacle mounted therein having a sliding cover, a lock for the cover when in the closed position, a lug on the cover, a hooked pawl pivoted to the box and adapted to be moved by the lug when the receptacle is inserted in the fare box, said pawl being arranged to be tilted when the receptacle is withdrawn from the box.

3. The combination in a fare box, of a drawer, a receptacle mounted in the drawer, a sliding cover for the receptacle, a lock for the sliding cover, lugs on said cover, a transverse rod, two hooked pawls pivotally mounted on the rod, springs for said pawls, said pawls being in the path of the lugs so that when the receptacle is inserted in the box the lugs will spring past the pawls and be retained thereby and when the box is opened and the drawer pulled out the pawls will first move the sliding cover to its closed position and lock it and then will swing on their pivots so as to allow the removal of the receptacle.

4. The combination in a fare box, of a sliding drawer, a fare receptacle mounted within the drawer, a sliding cover for the fare receptacle having lugs, pawls actuated by the lugs, and stop mechanism to prevent the insertion of an instrument in the ways for the lugs so as to prevent tampering with the box.

5. The combination in a fare box of a casing, a drawer, a fare receptacle mounted in the drawer, a sliding cover provided with lugs and adapted to the receptacle, two hooked pawls each having diagonal slots therein to receive the lugs on the cover.

6. The combination in a fare box of a casing, a drawer, a fare receptacle mounted in the drawer, a sliding cover for said receptacle provided with a lug, a pawl mounted so as to turn and slide upon its pivot, a spring acting on the pawl said pawl having an inclined slot to receive the lug on the cover and having an arm which prevents the pawl turning until the receptacle is in a given position.

7. The combination of a casing, a drawer, a fare receptacle in said drawer, a sliding cover for said receptacle having a lug, a pawl adapted to slide and turn upon its pivot and having a hooked end and an inclined way and a slot back of the inclined way to receive the lug on the cover.

8. The combination of a casing, a drawer having a notch therein, a fare receptacle mounted in the drawer, means for discharging the fares into the fare receptacle, mechanism for operating the same, a two armed lever pivoted to the casing, one arm of said lever adapted to enter the notch in the drawer, the other arm of the lever being in position to be acted upon by the mechanism for operating the discharge means.

9. The combination of a casing, a drawer, a fare receptacle mounted in the drawer, a slide adapted to ways in the casing and arranged to close the passage leading from the fare receiving section, said slide having a notch therein, an arm pivoted to the casing and having a projection in the path of the drawer and a lug in the path of the fare receptacle and also having a lug adapted to enter the notch in the slide.

In testimony whereof, I have signed my name to this specification, in the presence of two subscribing witnesses.

GEORGE B. KOHLER.

Witnesses:
Jos. H. Klein,
Wm. A. Barr.